US006987922B2

(12) United States Patent
Bierman et al.

(10) Patent No.: US 6,987,922 B2
(45) Date of Patent: Jan. 17, 2006

(54) METHOD AND APPARATUS FOR CONTROLLING A VARIABLE OPTICAL ATTENUATOR IN AN OPTICAL NETWORK

(75) Inventors: Robert Michael Bierman, Ottawa (CA); Omayma Moharram, Carleton Place (CA); Victoria Donnelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 301 days.

(21) Appl. No.: 10/440,247

(22) Filed: May 19, 2003

(65) Prior Publication Data

US 2004/0109661 A1    Jun. 10, 2004

Related U.S. Application Data

(60) Provisional application No. 60/430,972, filed on Dec. 5, 2002.

(51) Int. Cl.
    *G02B 6/00*    (2006.01)

(52) U.S. Cl. ...................... 385/140; 359/249; 333/81 R
(58) Field of Classification Search ................. 385/140; 359/249; 333/81 R
    See application file for complete search history.

(56) References Cited

U.S. PATENT DOCUMENTS 6,207,949 B1    3/2001    Jackel 6,304,347 B1    10/2001   Beine et al.
2002/0168170 A1 * 11/2002  Chan ......................... 385/140
2003/0223728 A1 * 12/2003  Maeda et al. ............... 385/140

* cited by examiner

*Primary Examiner*—Sung Pak
(74) *Attorney, Agent, or Firm*—Victoria Donnelly (57) ABSTRACT

This invention describes a method for controlling attenuation for a variable optical attenuator (VOA) inserted in an optical path of an optical signal propagating in an optical network, comprising the steps of measuring power of the optical signal at the VOA; comparing the measured power with a target power; and if the measured power differs from the target power, changing the attenuation of the VOA in one or more variable size intervals (VSI) so that the power of the optical signal substantially equals to the target power, wherein the VSI being a function of the measured power and target power. The method further comprises the step of comparing the measured power with a Loss-of-signal (LOS) power threshold, and if the measured power is less than the LOS power threshold, changing the attenuation of the VOA in one or more variable size intervals so that the power of the optical signal substantially higher than the LOS power threshold, wherein the size of the variable interval being a function of the measured power and the LOS power threshold. The method dynamically computes a VSI, updates the VOA setting by said VSI, and manages a combination of open and closed VOA control loops to maintain the target power attenuation of the VOA The corresponding apparatus for controlling the VOA is also provided.

26 Claims, 9 Drawing Sheets

| Operating Scenarios | [Pinput − Poutput] (dB) | Network operating factor (α) α = 1 | | Network operating factor (α) α = 2 | |
|---|---|---|---|---|---|
| | | Pre-set value Δ = 3 dB 933 | Pre-set value Δ = 6 dB 935 | Pre-set value Δ = 3 dB 943 | Pre-set value Δ = 6 dB 945 |
| 1 912 | 0 | 3 | 6 | 3 | 6 |
| 2 914 | 3 | 6 | 9 | 9 | 12 |
| 3 916 | 6 | 9 | 12 | 15 | 18 |
| 4 918 | 20 | 23 | 26 | 43 | 46 |

Figure 9

METHOD AND APPARATUS FOR CONTROLLING A VARIABLE OPTICAL ATTENUATOR IN AN OPTICAL NETWORK

RELATED APPLICATION

This application claims priority from U.S. Provisional Patent Application Ser. No. 60/430,972 to Bierman, R. M., entitled "Method and Apparatus for Power Control in an Optical system", and filed on Dec. 5, 2002.

FIELD OF THE INVENTION

This invention relates generally to optical telecommunications networks and, in particular, to a method for controlling attenuation for a variable optical attenuator (VOA) inserted in an optical path of an optical signal propagating in an optical network.

BACKGROUND OF THE INVENTION

As it is well known, network re-configurations, link or node failures, protection switching, and add/drop multiplexing may cause abrupt changes of the power levels of signals propagating in optical telecommunications networks. This may cause degradation in signal-to-noise ratios (SNR) and increase in bit error rates (BER). To compensate for the unexpected power variations, a variable optical attenuator (VOA) is usually inserted (coupled with power monitoring and microcontroller apparatus) in the path of the incoming signal for each wavelength and the attenuator's setting is adjusted to a pre-determined fixed value which may or may not be sufficient to reduce and eliminate the unexpected signal power fluctuations. Generally, the VOA control loop mechanism is not fast enough to provide the required attenuation to prevent damage to downstream optical components in the optical network, which can occur on the sub-millisecond timescale. For example, a newly added channel may pass through a downstream optical amplifier that services a plurality of optical channels. The newly added channel may instantaneously have too much optical power, until the VOA can adjust it to a pre-determined fixed value. In the meantime, the amplifier gain will be reduced until its own internal control loop can compensate for the excess input power by increasing its signal power, in a constant gain amplifier. The plurality of optical channels momentarily suffers a drop in optical power, which may lead to excessive BER on these channels. The attenuation of the VOA is not always adequate in this case to eliminate the power spikes that could damage the downstream optical components and cannot be changed fast enough to avoid the damage.

Figure 1:
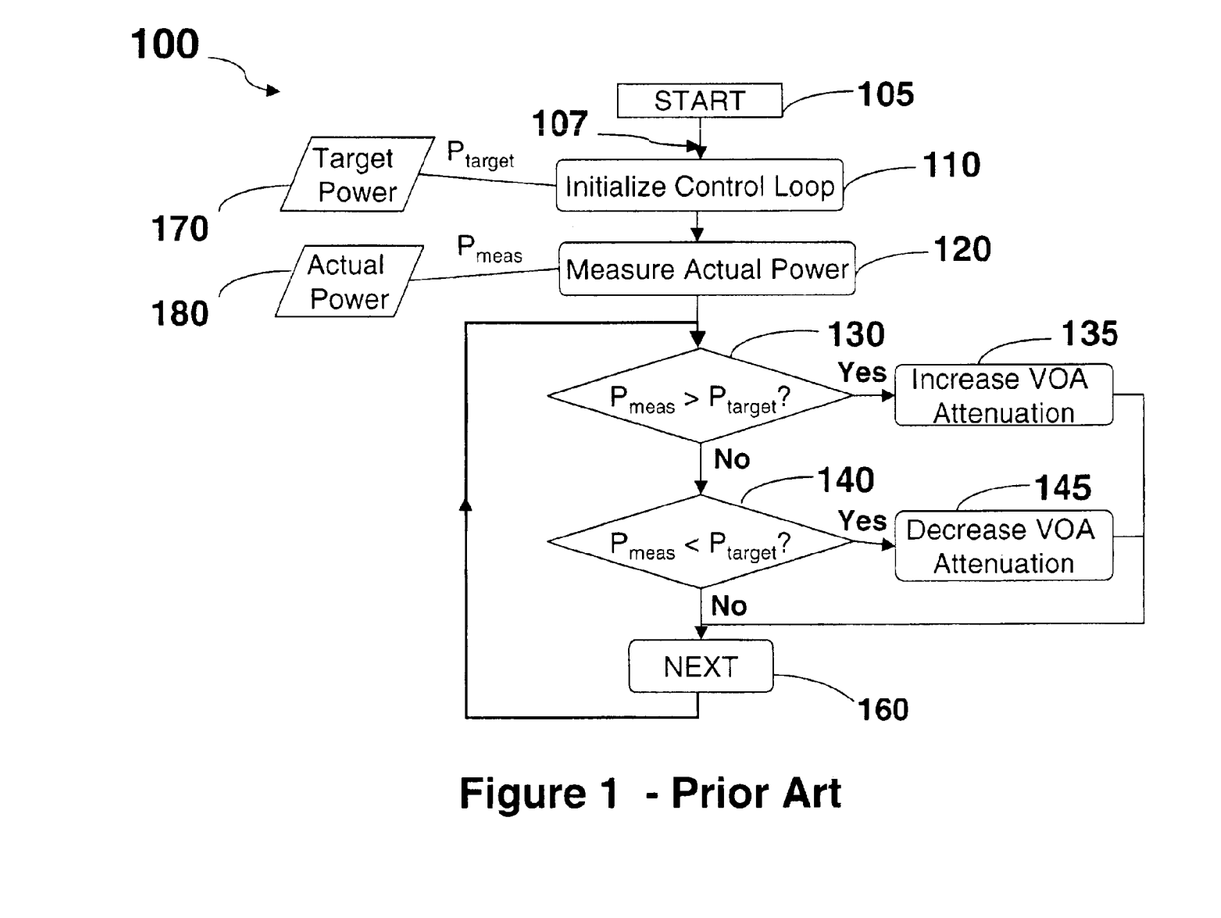
FIG. 1 is a flow diagram for a prior art VOA attenuation setting algorithm.

FIG. 1 shows a flow diagram 100 for a simple prior art VOA attenuation setting algorithm, wherein upon start up (block 105) routine 107 initializes the VOA attenuation (block 110) using a target power determined during commissioning of installed system (block 170) to maintain a constant mean output power in a closed loop manner. Routine 107 uses the actual power (block 120) measured by the power monitoring (block 180) to adjust the VOA attenuation setting when power level changes.

If measured power is greater than target power (block 130) routine 107 increases VOA attenuation (block 135). Routine 107 provides the new value (block 160) to the microcontroller to adjust VOA attenuation setting. If measured power is less than target power (block 140) routine 107 decreases VOA attenuation (block 145). Routine 107 provides the new value (block 160) to the microcontroller to set up the VOA attenuation.

As the input power varies, the VOA attenuation compensates to produce a stable output power. If the input power drops, the VOA attenuation decreases towards zero. If the input power drops to nil, the control algorithm maintains the VOA attenuation at zero.

Figure 2:
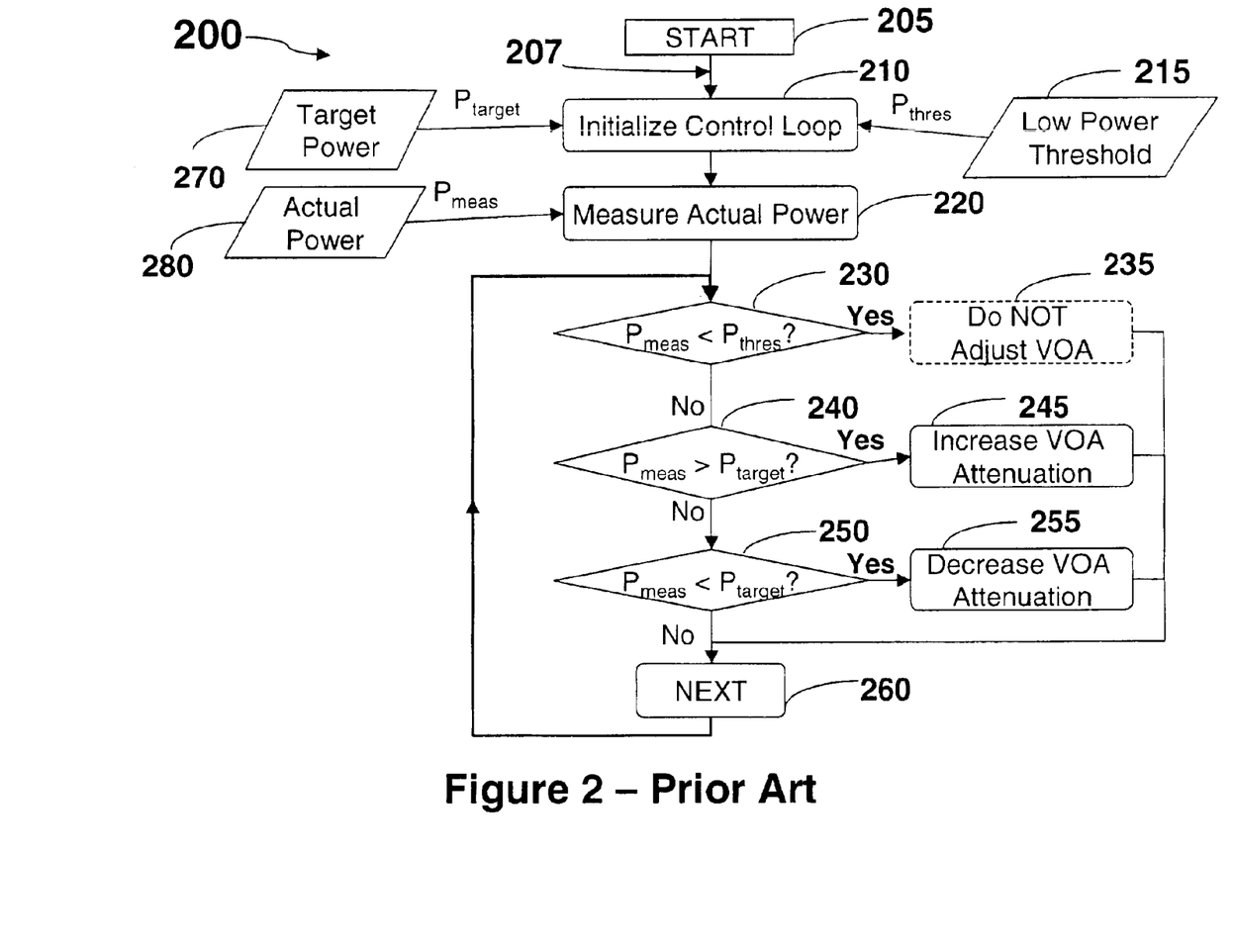
FIG. 2 is a flow diagram for another prior art VOA attenuation setting algorithm.

FIG. 2 shows a flow diagram for another prior art VOA attenuation setting algorithm, wherein upon start up (block 205) routine 207 adjusts the VOA attenuation caused by power changes. Target power (block 270) and low power threshold (block 215) are determined during commissioning of installed system in the network. Routine 207 uses these values to initialize the VOA control loop (block 210). Routine 207 uses actual power (block 220) measured by the power monitor (block 280) to adjust VOA attenuation when power changes are detected. If the measured power is less than a pre-determined threshold value (block 230) routine 207 continues (block 235) with no adjustment to VOA attenuation (block 260) and the microcontroller maintains current VOA attenuation setting. If the measured power is greater than the target power (block 240) routine 207 increases the VOA attenuation (block 245) and continues (block 260) where the microcontroller increases the VOA attenuation setting. If the measured power is less than the target power (block 250) routine 207 decreases VOA attenuation (block 255) and continues (block 260) where microcontroller decreases the VOA attenuation setting. If the power level is greater than a pre-determined threshold value, it stops controlling the VOA and maintains the power level at the current value, at the time the large deviation was detected. The VOA control loop moves into an open loop mode to maintain constant attenuation until power is restored and stabilized.

Figure 3:
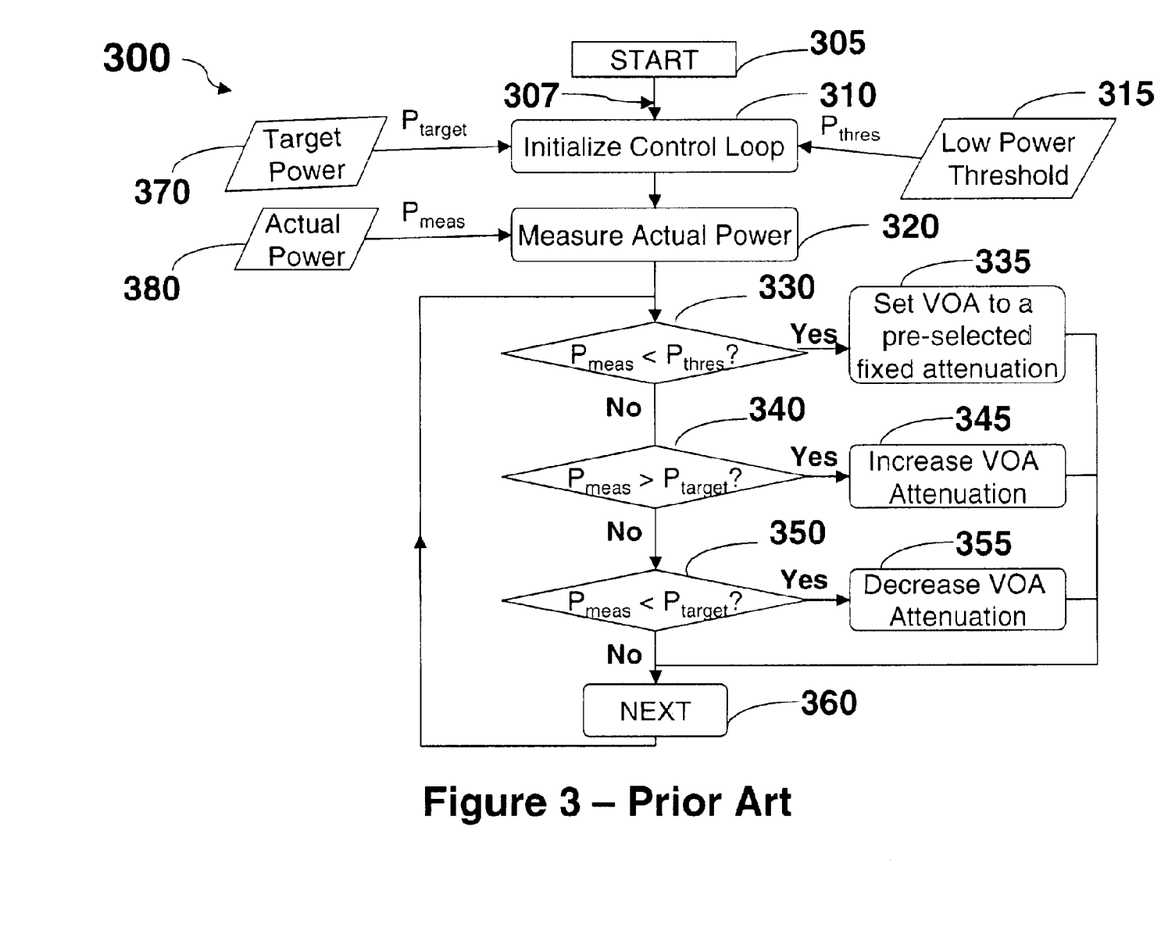
FIG. 3 is a flow diagram for yet another prior art VOA attenuation setting algorithm.

FIG. 3 shows a flow diagram of a U.S. Pat. No. 6,207,949 entitled, "Method and apparatus for stabilizing attenuators in optical networks" to Jackel, J., issued on Mar. 27, 2001, for a pre-determined fixed VOA attenuation setting algorithm. This operates the VOA at a pre-determined fixed value less than the minimum attenuation, wherein upon start up (block 305) routine 307 sets the VOA attenuation to a pre-determined fixed value less than the minimum attenuation whenever a loss of incoming signal power is detected. The target power (block 370) and low power threshold (block 315) are determined during commissioning of installed system in the network. Routine 307 initializes the VOA control loop (block 310) with the target power and low power threshold values. Routine 307 uses actual power (block 320) measured by the power monitoring (block 380) to adjust the VOA attenuation setting. If measured power is less than pre-determined threshold (block 330) routine 307 sets the VOA attenuation to a pre-determined fixed value of less than the minimum attenuation (block 335) and continues (block 360) where the microcontroller sets the VOA attenuation level to a pre-determined fixed value of less than the minimum attenuation. If the measured power is greater than the target power (block 340) routine 307 increases the VOA attenuation (block 345) by a pre-determined fixed value of less than the minimum attenuation and continues (block 360) where the microcontroller sets the VOA to the new value. If measured power is less than target power (block 350) routine 307 decreases VOA attenuation (block 355) by a pre-determined fixed value of less than the minimum attenuation and continues (block 360) where microcontroller sets the VOA attenuation to the new value.

The pre-determined fixed attenuation value of less than the minimum attenuation reduces some power spikes in the optical network. However, this pre-determined fixed attenuation value of less than the VOA minimum attenuation may not be sufficient to eliminate the power spikes occurred in the optical network that cause optical channel signal-to-noise degradation and increase in bit error rate, and the attenuation may not be changed fast enough to avoid these problems.

Figure 4:
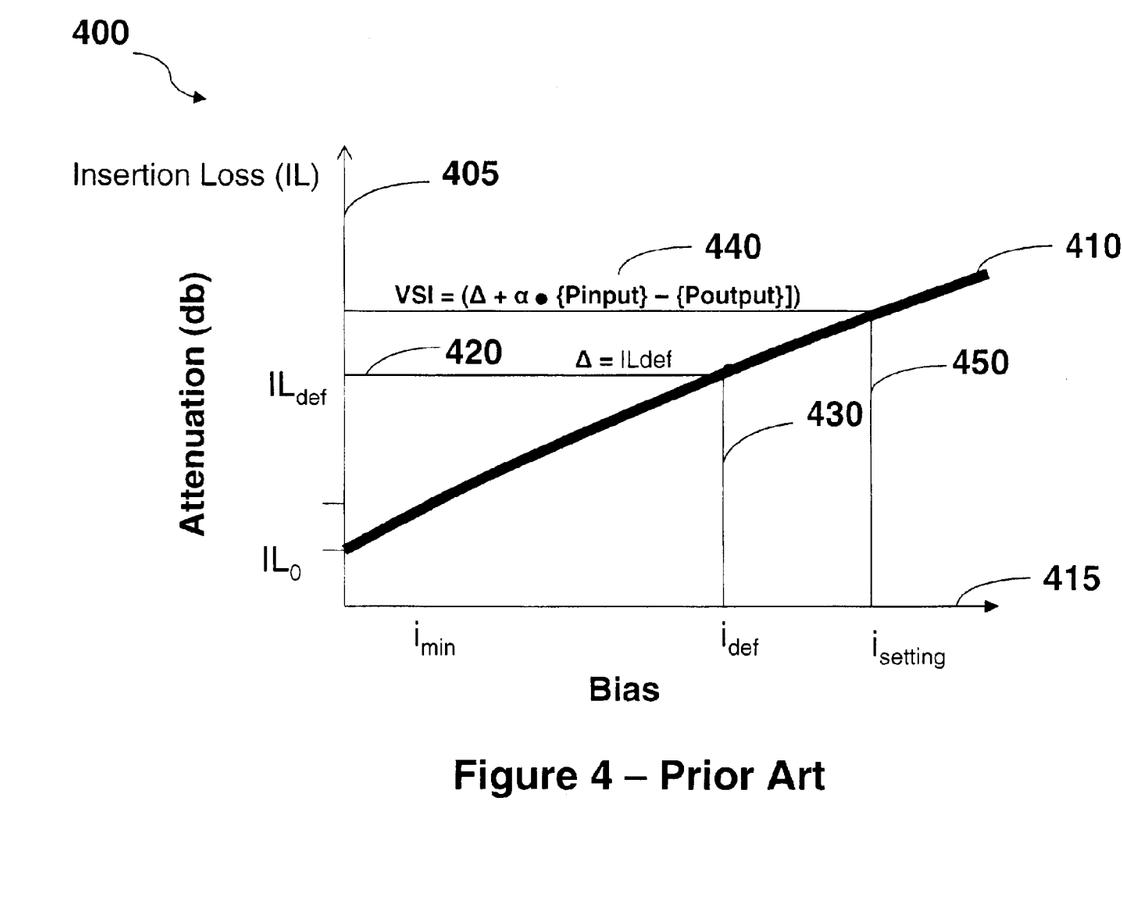
FIG. 4 illustrates a typical VOA attenuation response.

Similarly, a U.S. Pat. No. 6,304,347 entitled, "Optical power management in an optical network" to Beine, T., et al, issued on Oct. 16, 2001, teaches a system for managing signal power levels in an optical network where power parameters information exchanges and re-configuring of the nodes may cause abrupt changes of the power levels of the signal propagating in the optical network that may cause degradation in the SNR (signal-to-noise ratios) and BER (bit error rates). The prior art teaches of a VOA control loop operates in an open loop and closed loop modes. When the VOA control loop is open, the VOA attenuation is set to a pre-calibrated fixed value. FIG. 4 shows a typical VOA attenuation response 410, in terms of insertion loss attenuation in dB 405 and bias 415, the pre-calibrated fixed value 420 is equal to the default insertion loss for a default input 430 of the VOA. When the VOA control loop is closed, attempts are made to hold the output power for the VOA constant for changes at the input. A control algorithm, similar to that of U.S. Pat. No. 6,207,949 and is shown in FIG. 3, is implemented to determine the switching between closed loop and open loop VOA operations. Upon start up (block 305) routine 307, representing the prior art VOA control loop algorithm used by the microcontroller, when the VOA control loop is in open mode, sets the VOA attenuation to a pre-calibrated fixed value whenever a loss of incoming signal power is detected. Routine 307 initializes the VOA control loop (block 310) using target power (block 370) and low power threshold (315) determined during commissioning of the installed node in the optical network. Routine 307 uses actual power (block 320) measured by the power monitoring (block 380) to determine the required attenuation setting for VOA. If measured power is less than predetermined threshold (block 330) routine 307 sets the VOA attenuation to a pre-calibrated fixed value and continues (block 360) where the microcontroller sets VOA attenuation to the pre-calibrated fixed value. If measured power is greater than target power (block 340) routine 307 increases the VOA attenuation (block 345) by a delta determined from input and output power measurements and continues (block 360) where the microcontroller increases the VOA setting by the new delta. If measured power is less than target power (block 350) routine 307 decreases VOA attenuation (block 355) by a delta determined using input and output power measurements and continues (block 360) where the microcontroller decreases the VOA setting by the new delta. The deltas are fixed values based on input and output power measurements.

Unfortunately, the teaching of U.S. Pat. No. 6,304,347, where the VOA attenuation is set at a pre-calibrated fixed value and fixed deltas, may or may not be sufficient to eliminate power spikes which occur in the optical network and which cause degradation in SNR and excessive BER, and it cannot be changed sufficiently fast in order to avoid these problems.

Accordingly, there is a need for the development of improved methods and devices for power control in optical systems and networks, which would avoid and reduce the shortcomings and limitations of the prior art.

SUMMARY OF THE INVENTION

It is an object of the present invention to provide method and apparatus for controlling attenuation for a variable optical attenuator (VOA) in optical systems and networks, which would provide sufficiently high attenuation whenever a loss and a degradation of incoming signal power is detected, and which would provide more expedient adjustments of the VOA attenuation when a signal power fluctuates.

The invention, therefore, according to one aspect provides a method for controlling attenuation for a variable optical attenuator (VOA) inserted in an optical path of an optical signal propagating in an optical network, the method comprising the steps of measuring power of the optical signal {Pmeas} at the VOA; comparing the measured power {Pmeas) with a target power {Ptarget}; and if the measured power {Pmeas} differs from the target power {Ptarget}, changing the attenuation of the VOA in one or more variable size intervals (VSI) so that the power of the optical signal substantially equals to the target power {Ptarget}, wherein the size of the variable interval being a function of the {Pmeas} and {Ptarget}. The method further comprises the step of comparing the measured power {Pmeas) with a Loss-of-signal (LOS) power threshold {Pthres}, and if the measured power {Pmeas} is less than the LOS power threshold {Pthres}, changing the attenuation of the VOA in one or more variable size intervals (VSI) so that the power of the optical signal substantially higher than the power threshold {Pthres}, wherein the size of the variable interval being a function of the {Pmeas} and {Pthres}.

The step of measuring power of the optical signal {Pmeas} at the VOA comprises measuring the optical signal power at an input to the VOA {Pinput}; measuring the optical signal power at an output of the VOA {Poutput}; and measuring the optical signal power at an input to the VOA {Pinput} and at an output of the VOA {Poutput}. The step of changing the attenuation of the VOA further comprising the steps of adjusting and updating the VOA attenuation in variable size intervals (VSI) if the measured power {Pmeas} is initially below the LOS power threshold {Pthres} and changes to a level higher and lower than the target power {Ptarget}. The step of changing the attenuation of the VOA further comprises determining the variable size interval (VSI), wherein the VSI being a function of VOA attenuation setting parameters and network operating requirements including a pre-calibrated manufacturing default insertion loss {Δ} and commissioned network operating requirements factors {α(i), wherein, i=1, 2, . . . , n}. The step of changing the attenuation of the VOA may comprise determining the VSI as a linear function of the parameters {Δ, α, Pmeas, Pthres, Ptarget}; a nonlinear function of said parameters; and a combination of linear and nonlinear functions of said parameters.

Preferably, the step of determining the VSI for changing the attenuation of the VOA comprises computing the VSI according to one or more of the following formulae:

$$VSI = \Delta + \sum_{i=1}^{n} \alpha(i) \cdot [\{Pmeas\} - \{Pthres\}]^n$$

if the measured power {Pmeas} at the input to the VOA is below the LOS power threshold {Pthres}; and $$VSI = \Delta + \sum_{i=1}^{n} \alpha(i) \cdot [\{Pmeas\} - \{Ptarget\}]^n$$

if the measured power {Pmeas} at the input to the VOA changes to a level higher and lower than the target power {Ptarget}.

Alternatively, the step of determining the VSI for changing the attenuation of the VOA may comprise computing the VSI according to one or more of the following formulae:

$$VSI = \Delta + \sum_{i=1}^{n} \alpha(i) \cdot [\{Pthres\} - \{Pmeas\}]^n$$

if the measured power {Pmeas} at the output of the VOA is below the power threshold {Pthres}; and $$VSI = \Delta + \sum_{i=1}^{n} \alpha(i) \cdot [\{Ptarget\} - \{Pmeas\}]^n$$

if the measured power {Pmeas} at the output of the VOA changes to a level higher and lower than the target power {Ptarget}.

Yet alternatively, for measured power at the input to the VOA {Pinput} and at the output of the VOA {Poutput}, the step of determining the VSI for changing the attenuation of the VOA may comprise computing the VSI according to the following formula:

$$VSI = \Delta + \sum_{i=1}^{n} \alpha(i) \cdot [\{Pinput\} - \{Poutput\}]^n$$

if the measured power {Pmeas} is initially below the LOS power threshold {Pthres} and changes to a level higher and lower than the target power {Ptarget}.

In accordance with another aspect of the invention, there is provided an apparatus for controlling attenuation for a variable optical attenuator (VOA) inserted in an optical path of an optical signal propagating in an optical network comprising a means for measuring power of the optical signal {Pmeas} at the VOA; a means for comparing the measured power {Pmeas} with a target power {Ptarget}; and means for changing the attenuation of the VOA in one or more variable size intervals (VSI) so that the power of the optical signal substantially equals to the target power {Ptarget}. The apparatus further comprises a means for comparing the measured power {Pmeas} with a LOS power threshold {Pthres} and means for changing the attenuation of the VOA in one or more variable size intervals (VSI) so that the power of the optical signal substantially higher than the LOS power threshold {Pthres}. The means for changing the attenuation of the VOA further comprising means for adjusting and updating the VOA attenuation in variable size intervals (VSI) if the measured power {Pmeas} is initially below the LOS power threshold {Pthres} and changes to a level higher and lower than the target power {Ptarget}. The means for changing the attenuation of the VOA comprises a means for determining the variable size intervals (VSI) and the means for determining the variable size intervals (VSI) further comprises a means for computing the VSI as a linear function of the parameters {Δ, α, Pmeas, Pthres, Ptarget}; a nonlinear function of said parameters; and a combination of linear and nonlinear functions of said parameters. The means for computing the variable size intervals (VSI) comprises a means for storing the VSI for adjusting and updating the VOA attenuation.

Further, the apparatus for controlling attenuation for a variable optical attenuator (VOA) inserted in an optical path of an optical signal propagating in an optical network comprises a means for measuring the optical signal power at an input to the VOA; a means for measuring the optical signal power at an output of the VOA; and a means for measuring the optical signal power at an input to the VOA and at an output of the VOA. The means for measuring power of the optical signal at the VOA comprises a tap coupler for detecting the power of the optical signal at the VOA and a tap monitor for measuring the power of the optical signal at the VOA. Moreover, the means for changing the attenuation of the VOA comprises a smart microcontroller for determining a VSI, computing the VSI, and storing the VSI for adjusting and updating the VOA attenuation whenever the measured signal power is below a LOS power threshold and whenever the change in measured signal power is higher and lower than the target power.

In accordance with the embodiments of the invention, the method and apparatus for controlling attenuation for a variable optical attenuator (VOA) inserted in an optical path of an optical signal propagating in an optical network dynamically computes the VSI for changing the VOA attenuation setting to maintain the target power attenuation in an effective way. The VOA dynamic attenuation setting is achieved in variable size intervals and is set to substantially high non-zero value, thus ensuring more expedient process of adjusting the VOA's attenuation, providing safety for downstream optical components, and eliminating undesirable power spikes occurring in the optical network.

Thus, the embodiments of the present invention provide improved method and apparatus for controlling attenuation for variable optical attenuator (VOA) in optical systems and networks that would overcome the shortcomings and limitations of the prior arts.

BRIEF DESCRIPTION OF THE DRAWING

The invention is better understood from the following description of a preferred embodiment together with reference to the accompanying drawing, in which.

DESCRIPTION OF THE PREFERRED EMBODIMENTS

Figure 5:
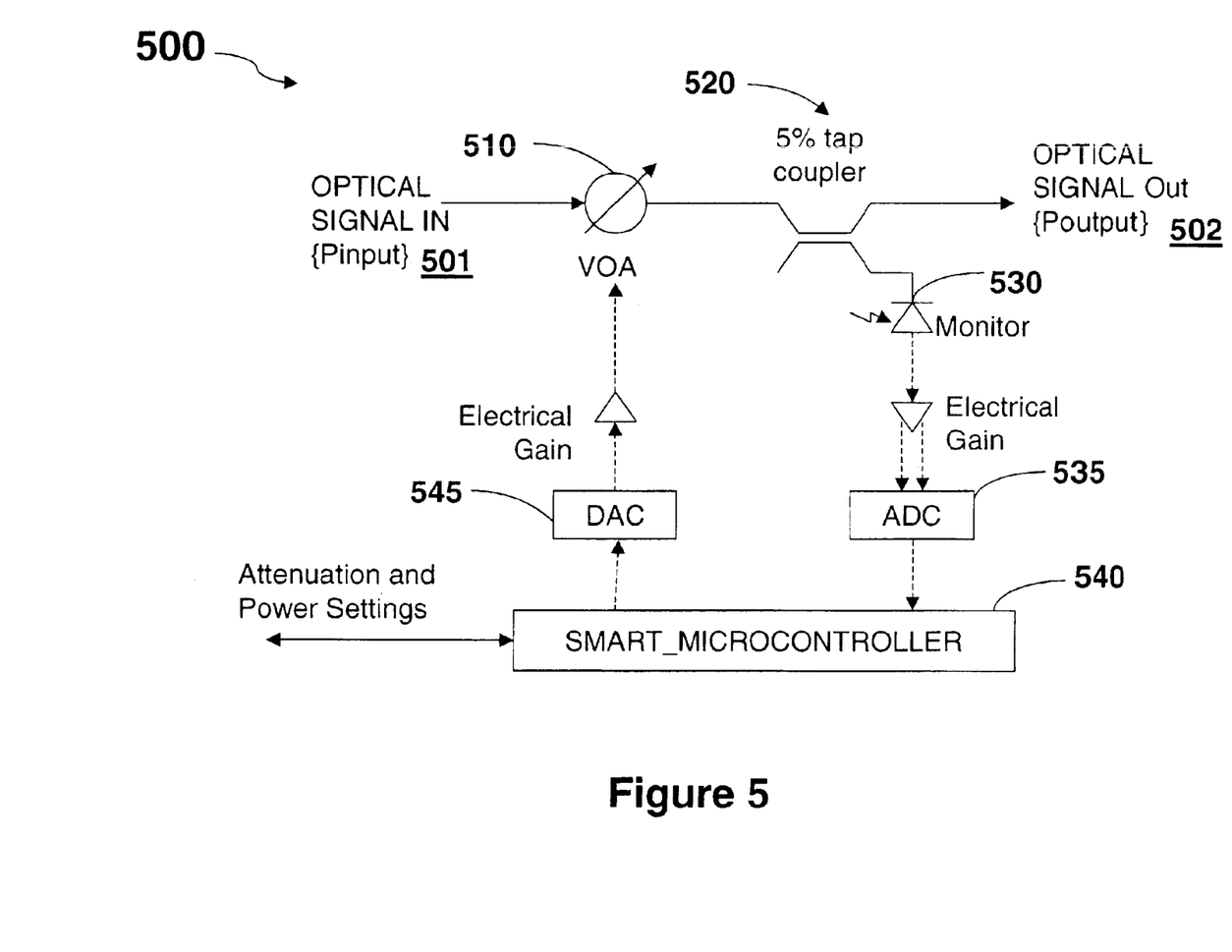
FIG. 5 is a diagram for an apparatus for controlling attenuation for a VOA in accordance with a first embodiment of this invention.

FIG. 5 shows an apparatus 500 for controlling attenuation for a variable optical attenuator (VOA) 510 inserted in an optical path of an optical signal propagating in an optical network. In FIG. 5, a tap coupler 520 with a tap monitor 530 follows the VOA 510. The tap coupler 520 is for detecting the power of the optical signal 502 at an output of the VOA 510 and the tap monitor 530 is for measuring the power of the optical signal 502 at an output of the VOA 510. The optical tap coupler 520 is calibrated properly to accurately report the output power. This is done during the manufacturing process by placing an optical power-meter at the optical signal output and recording the photo detector response versus power. The tap coupler 520 output is sampled with an analogue-to-digital converter (ADC) 535. The result is processed by a smart microcontroller 540 and a new variable step interval (VSI) is determined for the VOA, wherein the VSI is a function of the VOA attenuation setting parameters and the network operating requirements. The attenuation of the VOA 510 is set by the smart microcontroller 540 via a digital-to-analogue converter (DAC) 545.

A control loop triggers when an optical signal power is present at the optical input 501 and is below a loss-of-signal (LOS) power threshold. The LOS power threshold is calibrated during the manufacturing process. When measuring the power in the optical signal after the VOA 510, the intrinsic insertion loss (IL) of the device introduces uncertainty to the LOS power threshold value. The optical tap photo detector response is recorded from the ADC (analogue-to-digital converter) 535 reading. This value is stored as the LOS power threshold.

Moreover, the input tap monitor 530 has to be calibrated before final assembly of the hardware. This removes the requirement for calibration of the LOS power threshold. The VOA 510 attenuation pre-set manufacturing value on loss-of-signal also has to be calibrated. This is achieved at manufacturing time by applying a known optical signal power at the input 501 and adjusting the VOA 510 until a desired amount of attenuation is achieved at the output 502. The DAC (digital-to-analogue converter) 545 setting coupled to the VOA 510 is recorded and stored. The optical tap monitor 530 may be used or, alternatively, an external power meter.

The target power VOA 510 attenuation set-point may be stored during the commissioning of the installed system in an optical network. The craftsperson adjusts the desired optical signal output power 502 from the VOA 510 to meet the requirements of the optical network. Once a stable value is achieved, the DAC 545 setting coupled to the VOA 510 is recorded and stored as the desired VOA 510 attenuation set-point, replacing the default value set at manufacturing time. Both the VOA 510 input 501 and tap coupler 520 output are calibrated. This allows two modes of operations for VOA 510 control loop. The first is the open loop where the VOA 510 provides a target attenuation power. In this case the tap coupler 520 is not used. The second mode of operations is where the VOA 510 attempts to provide an output power 502 close to the target power. In this case, the tap coupler 520 is used as a feedback mechanism, thus creating a closed control loop and depending on the network requirements, the VOA 510 may use one or both of the open and closed loop capabilities.

When the VOA 510 control loop is open, the VOA attenuation is set to the target power. When the VOA 510 control loop is closed, and the tap monitor 530 provides the feedback, attempts are made to hold the output power for the VOA 510 close to the target power for changes at the input 501. In the events where signal power levels are fluctuating due to link or node failures, and protection switching in the optical network, the VOA 510 detects the optical power fluctuations. The tap monitor 530 is coupled in turn to a smart microcontroller 540, which is also coupled to the VOA 510. With a valid optical signal at the input 501, the smart microcontroller 540 adjusts the optical power by changing the VOA 510 attenuation by one or more variable step intervals (VSI).

In order to handle the fluctuations in the power levels, the method is implemented so as to dynamically update the attenuation settings for VOA 510. If the VOA 510 control loop is operated in closed loop mode, the algorithm computes the variable step intervals (VSI) for changing the VOA 510 attenuation setting, wherein the VSI being a function of VOA attenuation setting parameters and network operating requirements including a pre-calibrated manufacturing default insertion loss $\{\Delta\}$ and commissioned network operating requirements factors $\{\alpha(i), \text{wherein } i=1, 2, \ldots, n\}$. The VOA 510 control loop holds this attenuation until input 501 is stable again. If a new target power value is provided, the loop is closed and the new output power 502 is recomputed and converted to.

Figure 6:
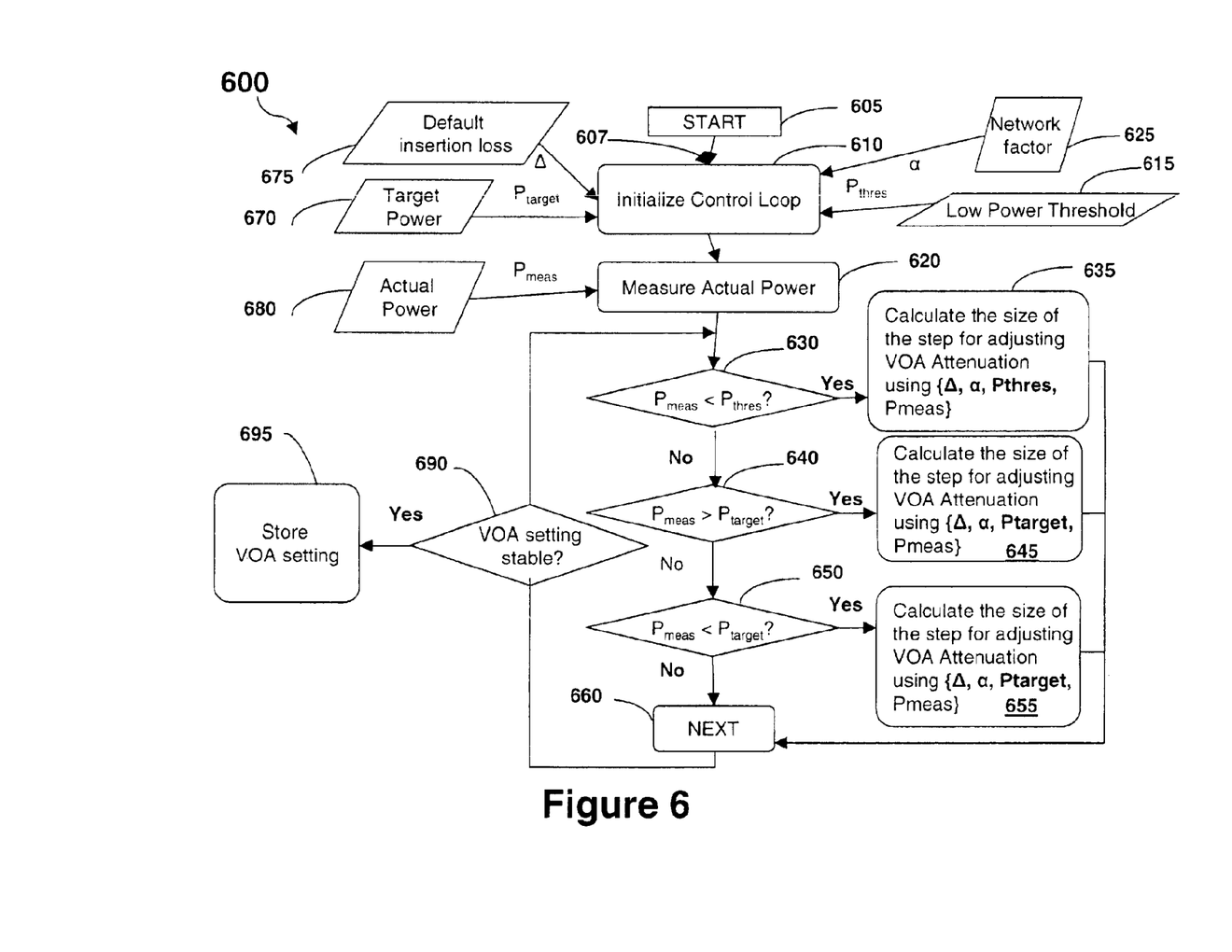
FIG. 6 is a flow diagram illustrating a method for controlling attenuation for the VOA of FIG. 5.

FIG. 6 shows a flow diagram for a procedure illustrating a method for controlling the VOA attenuation settings for the VOA of FIG. 5 of the first embodiment and VOAs of FIGS. 7 and 8 of the second and third embodiments as will be described in detail below. The VOA 500 has the smart microcontroller 540 for changing the VOA attenuation by one or more variable step intervals (VSI), wherein upon start up (block 605) routine 607 initializes the VOA control loop parameters (block 610). The parameters comprise a pre-calibrated manufacturing insertion loss value $\Delta$ (block 675), a network operating requirements factors a (block 625), measured target power {Ptarget} (block 670), and LOS power threshold {Pthres} (block 615). Routine 607 uses actual measured power {Pmeas} (block 620) by a tap monitor (block 680) to determine the required VSI for changing the VOA attenuation. Routine 607 stores the initial parameters $\{\Delta, \alpha, \text{Ptarget}, \text{Pthres}, \text{Pmeas}\}$. If the optical signal power drops below a LOS power threshold {Pthres} (block 630) routine 607 computes a new VSI for changing the VOA attenuation (block 635), wherein VSI being a function of the parameters $\{\Delta, \alpha, \text{Pthres}, \text{Pmeas}\}$ and continues (block 660) where the smart microcontroller sets the VOA attenuation to the new VSI, until optical power is restored. If VOA attenuation setting is stable (block 690) routine 607 stores the VSI (block 695). The flow diagram procedure, using the real time measured power and stored VSI, updates the VOA attenuation by the VSI as signal power fluctuates. If measured power is greater than target power (block 640) routine 607 computes the VSI for the VOA attenuation (block 645), wherein the VSI being a function of the parameters $\{\Delta, \alpha, \text{Ptarget}, \text{Pmeas}\}$ and continues (block 660) where the smart microcontroller adjusts the VOA attenuation by the new VSI. If VOA setting is stable (block 690) routine 607 stores the VSI (block 695). If measured power is less than target power (block 650) routine 607 computes the VSI for the VOA attenuation (block 655), wherein the VSI being a function of the parameters $\{\Delta, \alpha, \text{Ptarget}, \text{Pmeas}\}$ and continues (block 660) where the smart microcontroller adjusts the VOA setting by the new VSI. If VOA setting is stable (block 690) routine 607 stores the VSI (block 695).

The method for controlling the VOA comprises calculating the variable step intervals (VSI) for adjusting the attenuation of the VOA which may incorporate a linear function, a nonlinear function, and combination of linear and nonlinear functions of the VOA attenuation setting parameters and network operating requirements including a pre-calibrated manufacturing default insertion loss $\{\Delta\}$ and a number of network operating requirements factors $\{\alpha(i), \text{wherein, } i=1, 2, \ldots, n\}$.

For measured power at the input to the VOA, the VSI for adjusting the attenuation of the VOA is given by one or more of the following formulae:

$$VSI = \Delta + \sum_{i=1}^{n} \alpha(i) \cdot [\{Pmeas\} - \{Pthres\}]^n \quad (1)$$

if the measured power {Pmeas} at the input to the VOA {Pinput} is below a LOS power threshold {Pthres}; and $$VSI = \Delta + \sum_{i=1}^{n} \alpha(i) \cdot [\{Pmeas\} - \{Ptarget\}]^n \quad (2)$$

if the measured power {Pmeas} at the input to the VOA {Pinput} changes to a level higher and lower than the target power {Ptarget}.

For measured power at the output of the VOA {Poutput}, the VSI for adjusting the attenuation of the VOA is given by one or more of the following formulae:

$$VSI = \Delta + \sum_{i=1}^{n} \alpha(i) \cdot [\{Pthres\} - \{Pmeas\}]^n \quad (3)$$

if the measured power {Pmeas} at the output of the VOA {Poutput} is below a LOS power threshold {Pthres}; and $$VSI = \Delta + \sum_{i=1}^{n} \alpha(i) \cdot [\{Ptarget\} - \{Pmeas\}]^n \quad (4)$$

if the measured power {Pmeas} at the output of the VOA {Poutput} changes to a level higher and lower than the target power {Ptarget}.

For measured power at the input to the VOA {Pinput} and output of the VOA {Poutput}, the VSI for adjusting the attenuation of the VOA is given by the following formula:

$$VSI = \Delta + \sum_{i=1}^{n} \alpha(i) \cdot [\{Pinput\} - \{Poutput\}]^n \quad (5)$$

As an illustration, a first order approximation of the VSI formula (5) is given by the following formula:

$$VSI = \Delta + \alpha \cdot [\{Pinput\} - \{Poutput\}] \quad (6)$$

where $\Delta$ is a pre-calibrated manufacturing value typically between 3 db to 6 db, $\alpha$ is a network operating requirements factor and has a value between 1 and 2, (that is, $2 < \alpha > 1$, {Pinput} is the signal power at the input to a VOA, and {Poutput} is the signal power at an output of a VOA.

Thus, in accordance with the first embodiment of the present invention, the dynamic VOA attenuation setting method, incorporated on the smart microcontroller, manages the VOA control loop open and closed operations as follows:

Step 1: initializing the parameters {$\Delta$, $\alpha$, Ptarget, Pmeas, Pthres}.

Step 2: setting up VOA attenuation to target power {Ptarget} when VOA control loop is in open loop mode:
  smart microcontroller updates the VOA attenuation setting,
  VOA control loop is closed once the input to the VOA has stabilized, and
  VOA setting is adjusted until the target output power is reached.

Step 3: if the measured power {Pmeas} at the output of the VOA {Poutput} is below a LOS power threshold {Pthres}:
  smart microcontroller computes the VSI, wherein the VSI is given by the following formula:

$$VSI = \Delta + \sum_{i=1}^{n} \alpha(i) \cdot [\{Pthres\} - \{Pmeas\}]^n$$

controller changes the VOA attenuation by said VSI,
  VOA control loop closes and converges on the new optical output power,
  VOA switches to open loop mode and holds its current attenuation, and
  controller stores the new VSI for re-use in updating and adjusting the VOA attenuation settings.

Step 4: if the measured power {Pmeas} at the output of the VOA {Poutput} changes to a level higher and lower than the target power {Ptarget}:
  smart microcontroller calculates the VSI, wherein the VSI is given by the following formula:

$$VSI = \Delta + \sum_{i=1}^{n} \alpha(i) \cdot [\{Ptarget\} - \{Pmeas\}]^n$$

controller changes the VOA attenuation by said VSI,
  VOA control loop closes and converges on the new optical output power,
  VOA switches to open loop mode and holds its current attenuation, and
  controller stores the new VSI for re-use in updating and adjusting the VOA attenuation settings.

Step 5: dynamically adjusting the attenuation of the VOA in one or more VSI so that the power of the signal substantially equals to the target power as power fluctuates on a channel.

The method for controlling the VOA attenuation settings provides a combination of open and closed VOA control loops to maintain the target power attenuation and target power per channel out of the VOA. The method may incorporate first, second, and "n" order approximation of the VSI formulae for adjusting and updating the VOA attenuation.

Figure 7:
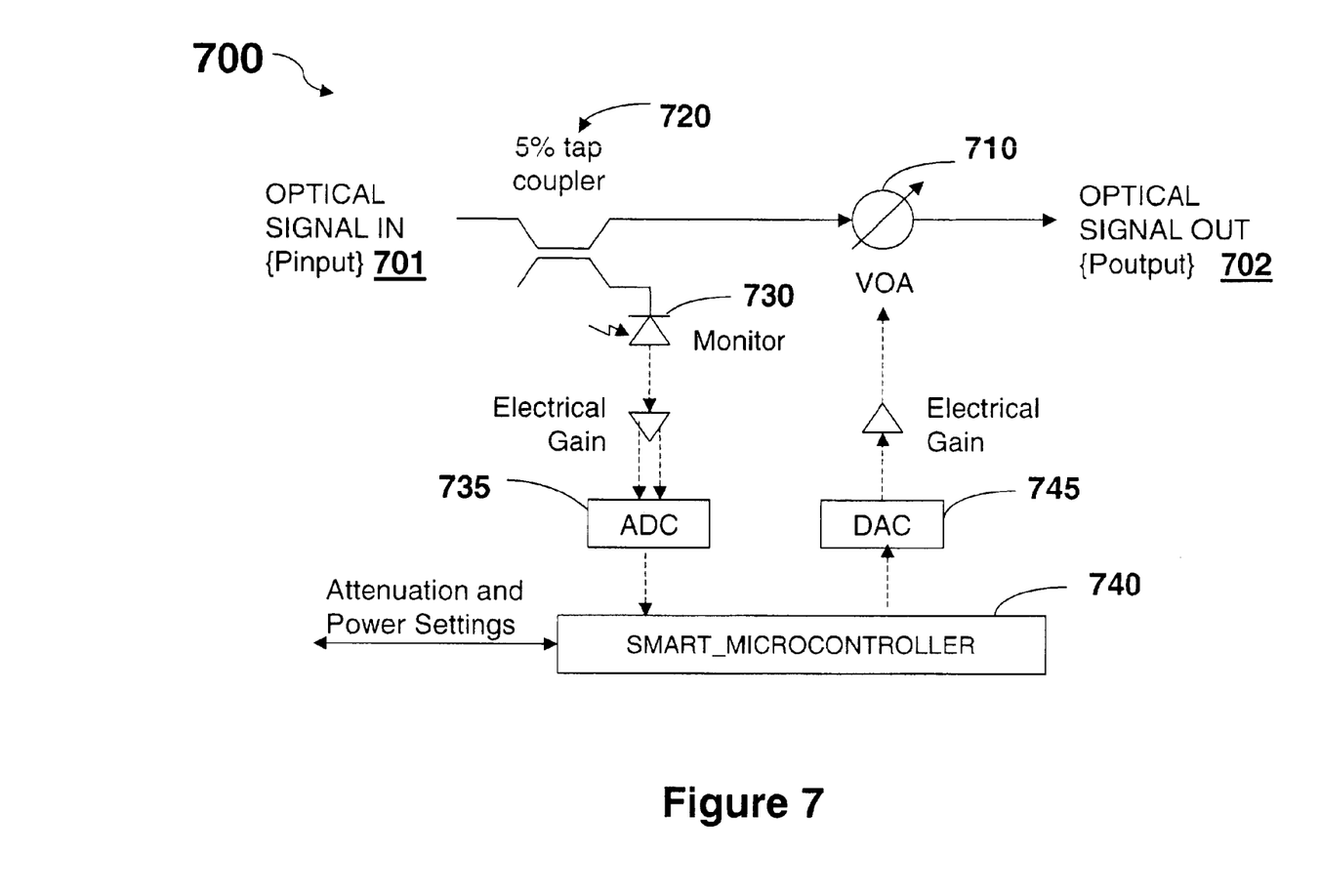
FIG. 7 is a diagram for an apparatus for controlling attenuation for a VOA in accordance with the embodiments of the invention.

FIG. 7 shows an apparatus 700 for controlling attenuation for a variable optical attenuator (VOA) 710 inserted in an optical path of an optical signal propagating in an optical network according to the second embodiment of the invention. In FIG. 7, a tap coupler 720 leads the VOA 710 with a tap monitor 730. The tap coupler 720 is for detecting the power of the optical signal 701 at an input to the VOA 710 and the tap monitor 730 is for measuring the power of the optical signal 701 at an input to the VOA 710. The optical tap coupler 720 is calibrated properly to accurately report the input power 701. As described before, calibration of the tap coupler 720 and tap monitor 730 are done during the manufacturing process. The LOS power threshold {Pthres} and target power {Ptarget} are calibrated during commissioning of the installed system to meet the requirements of the optical network. The tap coupler 720 output is sampled with an analogue-to-digital converter (ADC) 735 and the result is processed by a smart microcontroller 740. The attenuation of the VOA 710 is set by the smart microcontroller 740 via a digital-to-analogue converter (DAC) 645.

This apparatus allows two modes of operations for VOA 710 control loop. The VOA 710 may use one or both of the open and closed loop capabilities depending on the optical network requirements. The VOA 710 attenuation setting is determined using the parameters {Δ, α, Pmeas, Ptarget, Pthres} and the dynamic VOA attenuation setting method, as described with regard to FIG. 6 above. The method may incorporate first, second, and "n" order approximation for the VSI formulae for adjusting the attenuation of the VOA.

The smart microcontroller 740, manages the VOA control loop open and closed operations as follows:

Step 1: initializing the parameters {Δ, α, Ptarget, Pmeas, Pthres}.

Step 2: setting up VOA attenuation to target power {Ptarget} when VOA control loop is in open loop mode:
  smart microcontroller updates the VOA attenuation setting,
  VOA control loop is closed once the input to the VOA has stabilized, and
  VOA setting is adjusted until the target output power is reached.

Step 3: if the measured power {Pmeas} at the input to the VOA {Pinput} is below a LOS power threshold {Pthres},
  smart microcontroller calculates the VSI, wherein the VSI is given by the following formula:

$$VSI = \Delta + \sum_{i=1}^{n} \alpha(i) \cdot [\{Pmeas\} - \{Pthres\}]^n$$

controller changes the VOA attenuation by said VSI,
  VOA control loop closes and converges on the new optical output power,
  VOA switches to open loop mode and holds its current attenuation, and
  controller stores the new VSI for re-use in updating and adjusting the VOA attenuation settings.

Step 4: if the measured power {Pmeas} at the input to the VOA {Pinput} changes to a level higher and lower than the target power {Ptarget},
  smart microcontroller calculates the VSI, wherein the VSI is given by the following formula:

$$VSI = \Delta + \sum_{i=1}^{n} \alpha(i) \cdot [\{Pmeas\} - \{Ptarget\}]^n$$

controller changes the VOA attenuation by said VSI,
  VOA control loop closes and converges on the new optical output power,
  VOA switches to open loop mode and holds its current attenuation, and
  controller stores the new VSI for re-use in updating and adjusting the VOA attenuation settings.

Step 5: dynamically adjusting the attenuation of the VOA in one or more VSI so that the power of the signal substantially equals to the target power as power fluctuates on a channel.

Figure 8:
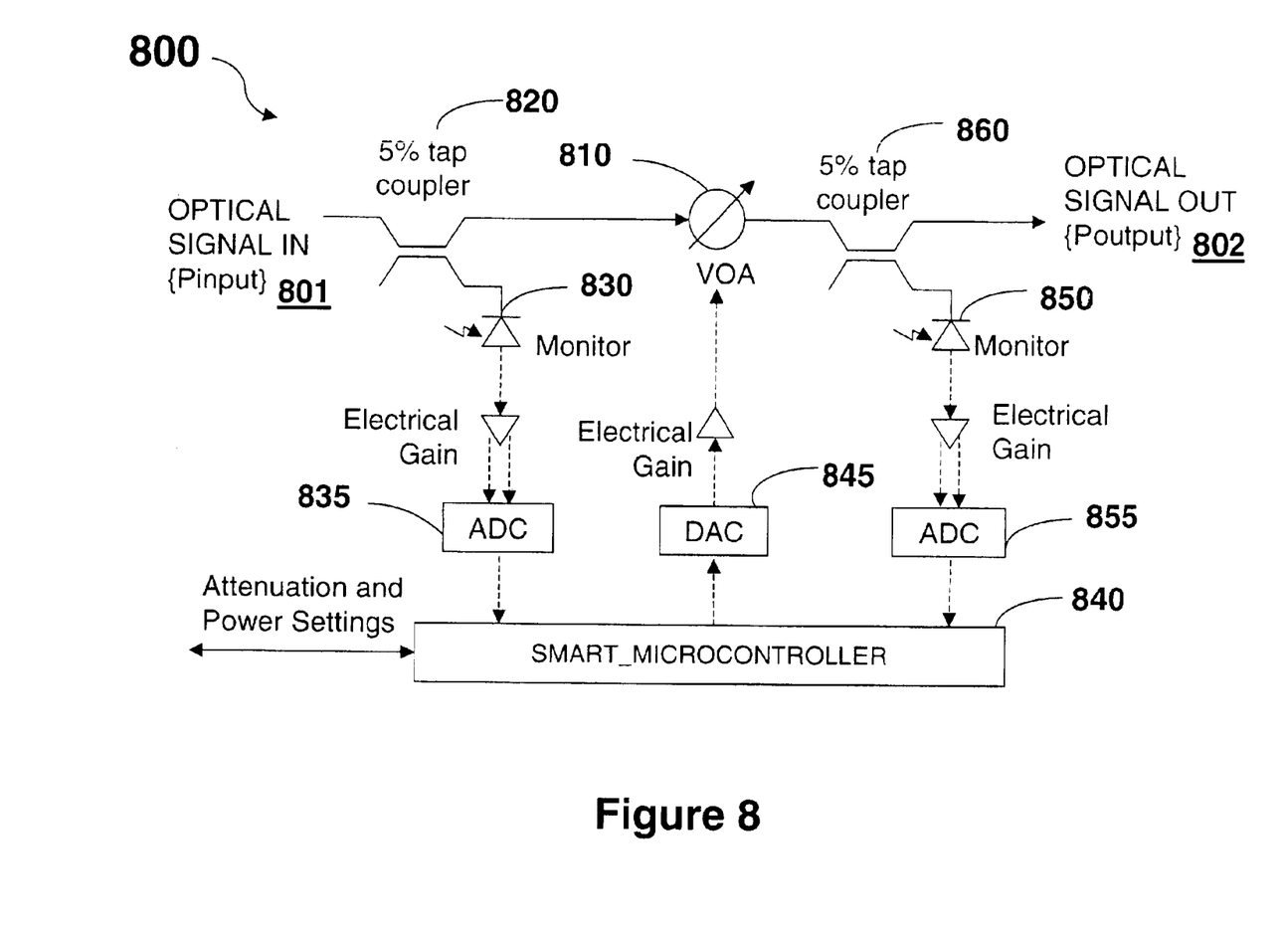
FIG. 8 is a diagram for an apparatus for controlling attenuation for a VOA in accordance with a third embodiment of this invention.

FIG. 8 shows an apparatus 800 for controlling attenuation for a variable optical attenuator (VOA) 810 inserted in an optical path of an optical signal propagating in an optical network according to the third embodiment of the invention. In FIG. 8, a tap coupler 820 leads the VOA 810 with a tap monitor 830 for detecting and measuring the power of the optical signal 801 at the input to the VOA 810, respectively. The tap coupler 820 output is sampled with an analogue-to-digital converter (ADC) 835 and the result is processed by a smart microcontroller 840. A tap coupler 860 follows the VOA 810 with a tap monitor 850 for detecting and measuring the power of the optical signal 802 at the output of the VOA 810, respectively. The tap coupler 860 output is sampled with an analogue-to-digital converter (ADC) 855 and the result is processed by a smart microcontroller 840. The attenuation of the VOA 810 is set by the smart microcontroller via a digital-to-analogue converter (DAC) 845. The optical tap coupler 820, tap monitor 830, tap coupler 860, and tap monitor 850 are calibrated properly to accurately report the input 801 and output 802 power levels. As before, calibration of the tap couplers and tap monitors are done during manufacturing process. The LOS power threshold {Pthres} and target power {Ptarget} are determined during commissioning of the installed system to meet the requirements of the optical network. This apparatus also allows two modes of operations for VOA control loop and depending on the network operating requirements, the VOA may use one or both of the open and closed loop capabilities. The VSI for the VOA attenuation setting is determined using the parameters {Δ, α, Ptarget, Pmeas, Pthres} and the dynamic VOA attenuation settings algorithm, as described with regard to FIG. 6 above. The method of controlling the VOA 810 with regard to apparatus 800 is similar to that shown in FIG. 6 and may incorporate first, second, and "n" order approximation for calculating the VSI for adjusting the attenuation of the VOA.

The smart microcontroller 840 manages the VOA control loop open and closed operations as follows:

Step 1: initializing the parameters {Δ, α, Ptarget, Pmeas, Pthres}.

Step 2: setting up VOA attenuation to target power {Ptarget} when VOA control loop is in open loop mode:
  smart microcontroller updates the VOA attenuation setting,
  VOA control loop is closed once the input to the VOA has stabilized, and
  VOA setting is adjusted until the target output power is reached.

Step 3: if the measured power at the input to the VOA {Pinput} and output of the VOA {Poutput} is below a LOS power threshold {Pthres} and changes to a level higher and lower than the target power {Ptarget},
  smart microcontroller calculates the VSI, wherein the VSI is given by the following formula:

$$VSI = \Delta + \sum_{i=1}^{n} \alpha(i) \cdot [\{Pinput\} - \{Poutput\}]^n$$

controller changes the VOA attenuation by said VSI,
  VOA control loop closes and converges on the new optical output power,
  VOA switches to open loop mode and holds its current attenuation, and
  controller stores the new VSI for re-use in updating and adjusting the VOA attenuation settings.

Step 4: dynamically adjusting the attenuation of the VOA in one or more VSI so that the power of the signal substantially equals to the target power as power fluctuates on a channel.

Figure 9:
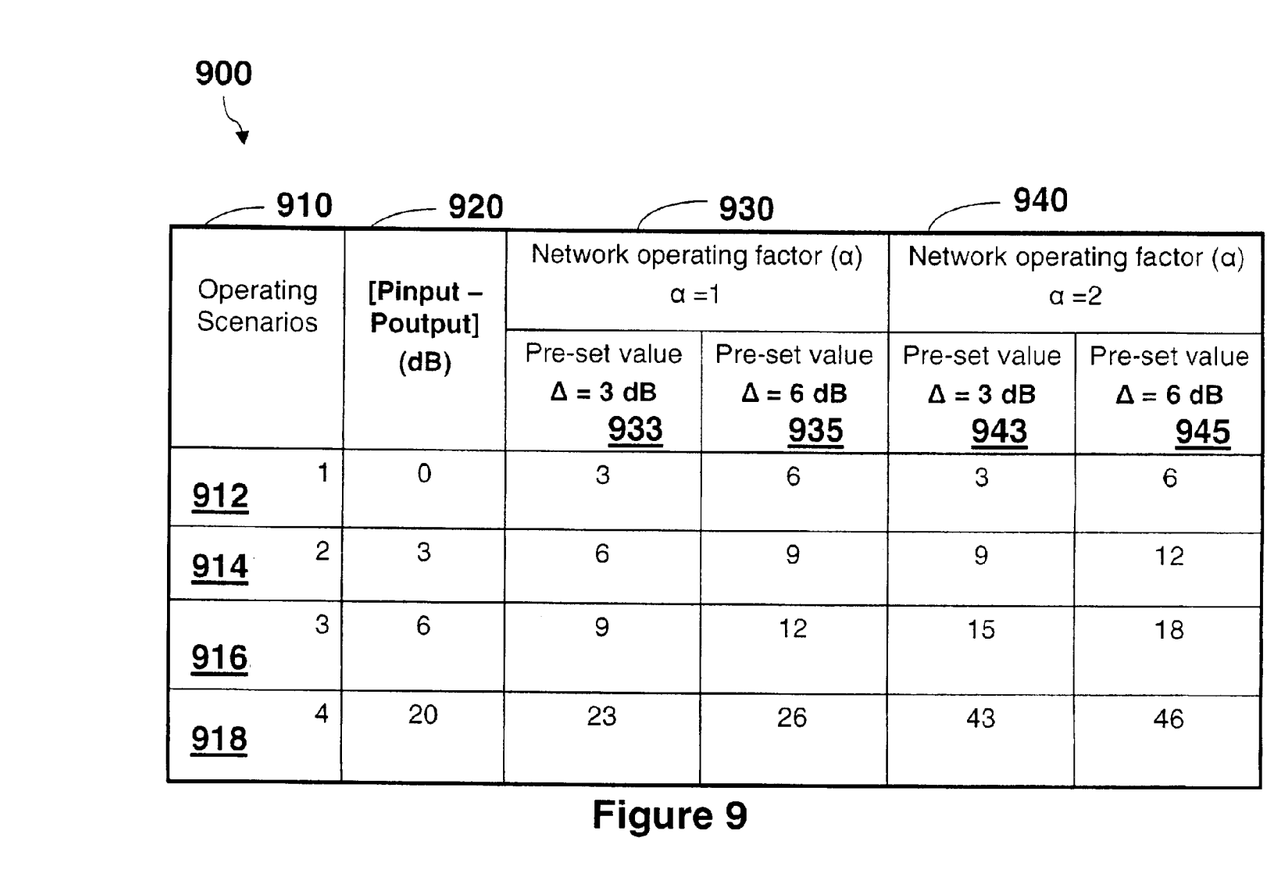
FIG. 9 shows a table for VOA attenuation settings provided by the method of FIG. 6 for the apparatus of FIG. 8.

FIG. 9 shows a table 900 for VOA attenuation settings calculated according to the method of FIG. 6 and for the apparatus 800 of the third embodiment of the invention by using the first order approximation of the VSI formula (6) shown above. For Δ=3 dB 933 and α=1 930, an optical signal having a level of −6 dBm may be attenuated by attenuation setting of 6 dB 914 to produce an output signal having a level of −12 dBm. For Δ=6 dB 945 and α=2 940, the same optical signal having a level of −6 dBm may be attenuated by attenuation setting of 6 dB 912 to produce the same output signal having a level of −12 dBm. Thus, the VOA attenuation settings are substantially high non-zero value to eliminate the power spikes and ensure safety for downstream optical components in the optical network.

It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A method for controlling attenuation for a variable optical attenuator (VOA) inserted in an optical path of an optical signal propagating in an optical network, the method comprising the steps of:
   (u) measuring power of the optical signal {Pmeas} at the VOA;
   (v) comparing the measured power {Pmeas) with a target power {Ptarget}; and
      if the measured power {Pmeas} differs from the target power {Ptarget},
   (w) changing the attenuation of the VOA in one or more variable size intervals (VSI) so that the power of the optical signal substantially equals to the target power {Ptarget}, the size of the variable interval being a function of a pre-calibrated manufacturing default insertion loss {Δ}, commissioned network operating requirements factors {α}, the {Pmeas}, and {Ptarget}, and wherein VSI is given by one or more of the following:
      (i) a linear function of the parameters {Δ, α, Pmeas, Ptarget},
      (ii) a nonlinear function of said parameters, and
      (iii) a combination of (i) and (ii).

2. A method as described in claim 1, further comprises the step of comparing the measured power {Pmeas} with a LOS power threshold {Pthres}, and if the measured power {Pmeas} is less than the LOS power threshold {Pthres}, changing the attenuation of the VOA in one or more variable size intervals (VSI) so that the power of the optical signal substantially higher than the LOS power threshold {Pthres}, wherein the size of the variable interval being a function of the {Δ}, the {α}, the {Pmeas}, and the {Pthres}, and wherein VSI is given by one or more of the following:
   (x) a linear function of the parameters {Δ, α, Pmeas, Pthres, Ptarget},
   (y) a nonlinear function of said parameters, and
   (z) a combination of (x) and (y).

3. A method as described in claim 2, wherein the step of measuring power of the optical signal {Pmeas } at the VOA comprises measuring the optical signal power at an input to the VOA {Pinput}.

4. A method as described in claim 2, wherein the step of measuring power of the optical signal {Pmeas} at the VOA comprises measuring the optical signal power at an output of the VOA {Poutput}.

5. A method as described in claim 2, wherein the step of measuring power of the optical signal {Pmeas} at the VOA comprises measuring the optical signal power at an input to the VOA {Pinput} and at an output of the VOA {Poutput}.

6. A method as described in claim 2, wherein the step of changing the attenuation of the VOA further comprising the steps of adjusting and updating the VOA attenuation in variable size intervals (VSI) if the measured power {Pmeas} is initially below the LOS power threshold {Pthres} and changes to a level higher and lower than the target power {Ptarget}.

7. A method for controlling attenuation for a variable optical attenuator (VOA) inserted in an optical path of an optical signal propagating in an optical network, the method comprising the steps of:
   (a) measuring power of the optical signal {Pmeas} at an input to the VOA;
   (b) comparing the measured power {Pmeas) with a target power {Ptarget}; and
   (c) if the measured power {Pmeas} differs from the target power {Ptarget}, changing the attenuation of the VOA in one or more variable size intervals (VSI) so that the power of the optical signal substantially equals to the target power {Ptarget}, the size of the variable interval (VSI) being a function of a pre-calibrated manufacturing default insertion loss {Δ}, commissioned network operating requirements factors {α(i), wherein, i=1, 2, . . . , n, {Pmeas, and {Ptarget}, and is given by one or more of the following formulae:

$$VSI = \Delta + \sum_{i=1}^{n} \alpha(i) \cdot [\{Pmeas\} - \{Pthres\}]^n$$

if the measured power {Pmeas} at the input to the VOA is below a LOS power threshold {Pthres}, and $$VSI = \Delta + \sum_{i=1}^{n} \alpha(i) \cdot [\{Pmeas\} - \{Ptarget\}]^n$$

if the measured power {Pmeas} at the input to the VOA changes to a level higher and lower than the target power {Ptarget}.

8. A method for controlling attenuation for a variable optical attenuator (VOA) inserted in an optical path of an optical signal propagating in an optical network, the method comprising the steps of:
   (d) measuring power of the optical signal {Pmeas} at an output of the VOA;
   (e) comparing the measured power {Pmeas) with a target power {Ptarget}; and
   (f) if the measured power {Pmeas} differs from the target power {Ptarget}, changing the attenuation of the VOA in one or more variable size intervals (VSI) so that the power of the optical signal substantially equals to the target power {Ptarget}, the size of the variable interval (VSI) being a function of a pre-calibrated manufacturing default insertion loss {Δ}, commissioned network operating requirements factors {α(i), wherein, i=1, 2, . . . , n, {Pmeas}, and {Ptarget}, and is given by one or more of the following formulae:

$$VSI = \Delta + \sum_{i=1}^{n} \alpha(i) \cdot [\{Pthres\} - \{Pmeas\}]^n$$

if the measured power {Pmeas} at the output of the VOA is below a LOS power threshold {Pthres}, and $$VSI = \Delta + \sum_{i=1}^{n} \alpha(i) \cdot [\{Ptarget\} - \{Pmeas\}]^n$$

if the measured power {Pmeas} at the output of the VOA changes to a level higher and lower than the target power {Ptarget}.

9. A method for controlling attenuation for a variable optical attenuator (VOA) inserted in an optical path of an optical signal propagating in an optical network, the method comprising the steps of:

(g) measuring power of the optical signal {Pmeas} at an input to the VOA {Pinput} and at an output of the VOA {Poutput};

(h) comparing the measured power {Pinput} with the target power {Ptarget};

(k) comparing the measured power {Poutput} with the target power {Ptarget}; and (l) if the measured power {Pmeas} differs from the target power {Ptarget}, changing the attenuation of the VOA in one or more variable size intervals (VSI) so that the power of the optical signal substantially equals to the target power {Ptarget}, the size of the variable interval (VSI) being a function of a pre-calibrated manufacturing default insertion loss {Δ}, commissioned network operating requirements factors {α(i), wherein, i=1, 2, . . . , n, the {Pinput}, and the {Poutput}, and is given by the following formula:

$$VSI = \Delta + \sum_{i=1}^{n} \alpha(i) \cdot [\{Pinput\} - \{Poutput\}]^n$$

if the measured power {Pmeas} is initially below a LOS power threshold {Pthres} and changes to a level higher and lower than the target power {Ptarget}.

10. An apparatus for controlling attenuation for a variable optical attenuator (VOA) inserted in an optical path of an optical signal propagating in an optical network, the apparatus comprising:

(1) a means for measuring power of the optical signal {Pmeas} at the VOA;

(2) a means for comparing the measured power {Pmeas} with a target power {Ptarget}; and (3) means for changing the attenuation of the VOA in one or more variable size intervals (VSI) so that the power of the optical signal substantially equals to the target power {Ptarget}, and wherein the VSI is given by one or more of the following formulae:

$$VSI = \Delta + \sum_{i=1}^{n} \alpha(i) \cdot [\{Pmeas\} - \{Ptarget\}]^n$$

if the measured power {Pmeas} at the input to the VOA changes to a level higher and lower than the target power {Ptarget}, and $$VSI = \Delta + \sum_{i=1}^{n} \alpha(i) \cdot [\{Ptarget\} - \{Pmeas\}]^n$$

if the measured power {Pmeas} at the output of the VOA changes to a level higher and lower than the target power {Ptarget}; and wherein {Δ} is a pre-calibrated manufacturing default insertion loss, and {α(i), i=1, 2, . . . , n} are commissioned network operating requirements factors.

11. An apparatus as described in claim 10, further comprising a means for comparing the measured power {Pmeas} with a LOS power threshold {Pthres} and means of changing the attenuation of the VOA in one or more variable size intervals (VSI) so that the power of the optical signal substantially higher than the LOS power threshold {Pthres}, and wherein the VSI is given by one or more of the following formulae:

$$VSI = \Delta + \sum_{i=1}^{n} \alpha(i) \cdot [\{Pmeas\} - \{Pthres\}]^n$$

if the measured power {Pmeas} at the input to the VOA is below the LOS power threshold {Pthres}, and $$VSI = \Delta + \sum_{i=1}^{n} \alpha(i) \cdot [\{Pthres\} - \{Pmeas\}]^n$$

if the measured power {Pmeas} at the output of the VOA is below the LOS power threshold {Pthres}.

12. An apparatus as described in claim 11, wherein the means for changing the attenuation of the VOA further comprising means for adjusting and updating the VOA attenuation in variable size intervals (VSI) if the measured power {Pmeas} is initially below the LOS power threshold {Pthres} and changes to a level higher and lower than the target power {Ptarget}.

13. An apparatus as described in claim 11, wherein the means for changing the attenuation of the VOA comprises a means for determining the variable size intervals (VSI).

14. An apparatus as described in claim 13, wherein the means for computing the variable size intervals (VSI) further comprises a means for storing the VSI for adjusting and updating the VOA attenuation.

15. An apparatus as described in claim 11, wherein the means for measuring power of the optical signal at the VOA comprises one or more of the following:

a means for measuring the optical signal power at an input to the VOA;

a means for measuring the optical signal power at an output of the VOA; and means for measuring the optical signal power at an input to the VOA and at an output of the VOA.

16. An apparatus as described in claim 15, wherein the means for measuring power of the optical signal at the VOA comprises a tap coupler for detecting the power of the optical signal at the VOA and a tap monitor for measuring the power of the optical signal at the VOA.

17. An apparatus as described in claim 11, wherein the means for changing the attenuation of the VOA comprises a smart microcontroller for determining a VSI, computing the VSI, and storing said VSI for adjusting and updating the VOA attenuation whenever the measured signal power is below a LOS power threshold and whenever the change in measured signal power is higher and lower than the target power.

18. The method as described in claim 7, further comprising comparing the measured power {Pmeas) with a LOS power threshold {Pthres}, and if the measured power {Pmeas} is less than the LOS power threshold {Pthres}, changing the attenuation of the VOA in one or more variable size intervals (VSI) so that the power of the optical signal substantially higher than the LOS power threshold {Pthres}.

19. The method as described in claim 7, wherein the step (c) further comprising adjusting and updating the VOA attenuation in variable size intervals (VSI) if the measured power {Pmeas} is initially below the LOS power threshold {Pthres} and changes to a level higher and lower than the target power {Ptarget}.

20. The method as described in claim 7, wherein the step (c) comprises determining the variable size interval (VSI), wherein the VSI being a function of VOA attenuation setting parameters and network operating requirements including a pre-calibrated manufacturing default insertion loss {$\Delta$} and commissioned network operating requirements factors {$\alpha(i)$, wherein, i=1, 2, . . . , n}.

21. The method as described in claim 8, further comprising comparing of the measured power {Pmeas) with a LOS power threshold {Pthres}, and if the measured power {Pmeas} is less than the LOS power threshold {Pthres}, changing the attenuation of the VOA in one or more variable size intervals (VSI) so that the power of the optical signal substantially higher than the LOS power threshold {Pthres}.

22. The method as described in claim 8, wherein the step (f) further comprising adjusting and updating the VOA attenuation in variable size intervals (VSI) if the measured power {Pmeas} is initially below the LOS power threshold {Pthres} and changes to a level higher and lower than the target power {Ptarget}.

23. The method as described in claim 8, wherein the step (f) comprises determining the variable size interval (VSI), wherein the VSI being a function of VOA attenuation setting parameters and network operating requirements including a pre-calibrated manufacturing default insertion loss {$\Delta$} and commissioned network operating requirements factors {$\alpha(i)$, wherein, i=1, 2, . . . , n}.

24. The method as described in claim 9, further comprises comparing the measured power {Pmeas) with a LOS power threshold {Pthres}, and if the measured power {Pmeas} is less than the LOS power threshold {Pthres}, changing the attenuation of the VOA in one or more variable size intervals (VSI) so that the power of the optical signal substantially higher than the LOS power threshold {Pthres}.

25. The method as described in claim 9, wherein the step (l) further comprising adjusting and updating the VOA attenuation in variable size intervals (VSI) if the measured power {Pmeas} is initially below the LOS power threshold {Pthres} and changes to a level higher and lower than the target power {Ptarget}.

26. The method as described in claim 9, wherein the step (l) comprises determining the variable size interval (VSI), wherein the VSI being a function of VOA attenuation setting parameters and network operating requirements including a pre-calibrated manufacturing default insertion loss {$\Delta$} and commissioned network operating requirements factors {$\alpha(i)$, wherein, i=1, 2, . . . , n}.

* * * * *